Sept. 7, 1965      A. F. LUND      3,205,078
METHOD OF CONCENTRATING CITRUS JUICE
Filed Aug. 10, 1961
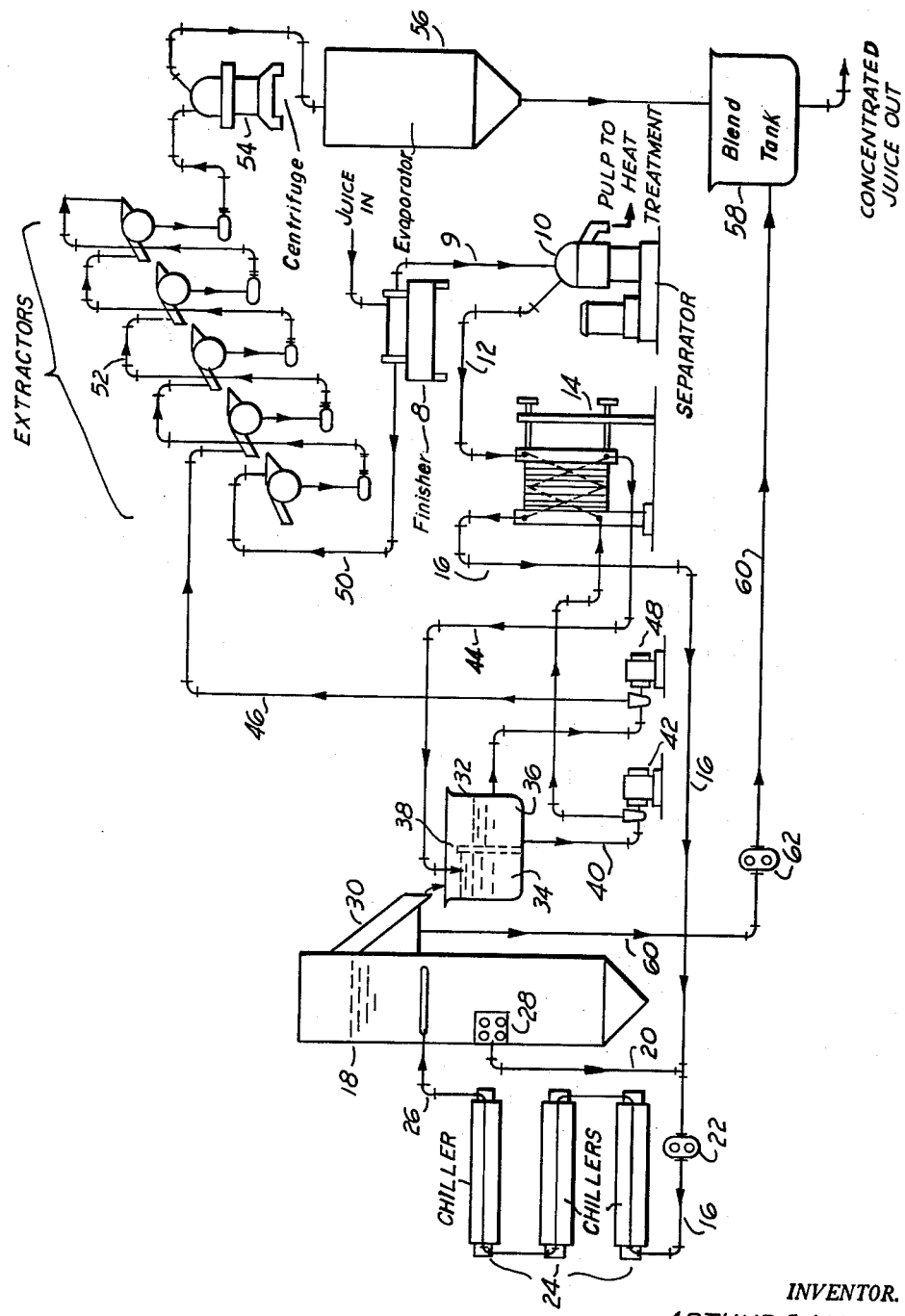
INVENTOR.
ARTHUR F. LUND
BY
ATTORNEY

United States Patent Office 3,205,078
Patented Sept. 7, 1965

3,205,078
METHOD OF CONCENTRATING CITRUS JUICE
Arthur F. Lund, Tampa, Fla., assignor to Cherry-Burrell Corporation, Cedar Rapids, Iowa, a corporation of Delaware
Filed Aug. 10, 1961, Ser. No. 130,606
2 Claims. (Cl. 99—205)

This invention relates to a method and system for concentrating fluid products and more particularly relates to a method in which concentration is accomplished by cooling the dilute solution and removing the ice crystals thereby formed.

Many methods are known and used for the commercial production of liquid concentrates of products such as fruit juices, vinegar, coffee, beer, etc. Many of these processes evaporate the water from at least part of the product in order to obtain the desired concentration. However, the use of heat drives off volatile flavoring compounds and aromatics resulting in a loss of flavor and aroma that reduces consumer acceptance of the finished product. To overcome the problem of flavor and aroma loss due to heat, processes have been developed in which the dilute product is cooled to a temperature below the freezing point of water thereby forming ice crystals which can then be separated from the fluid concentrate.

These freeze concentration processes are not, however, free from difficulties and, therefore, have not gained wide acceptance commercially. One of the disadvantages of such processes is the loss of concentrate. As the ice crystals are formed, the liquid concentrate tends to adhere to the crystals by capillary action, and when the crystals are separated from the liquid and discarded, they carry with them varying quantities of the concentrate. In a large processing plant, these losses can rapidly grow into a sizable amount that noticeably reduces the processor's profits.

Another problem in prior art freeze concentration processes is the difficulty of rapidly forming ice crystals thereby obtaining high concentration. In the continuous processes, the ice crystals formed are extremely small and cling together forming a semi-solid mass that resembles extremely wet snow or slush. Because of the very small size of the ice crystals, many of them will melt before they are separated from the liquid fraction. Although this is not a major problem in batch freeze concentration processes which the ice crystals are slowly formed and allowed to grow prior to separation, this problem has limited the degree to which some fluid products can be concentrated by the more rapid and desirable continuous methods.

Another difficulty that has slowed commercial acceptance of continuous freeze concentration methods is the dissipation of available refrigeration resulting in a relatively poor heat balance for the process. In other words, much of the energy supplied to such a system is supplied to produce the refrigeration necessary to freeze out the ice crystals. Some of this energy is lost when the ice crystals are separated and discarded. This, of course, makes the process more expensive to practice.

It is therefore an object of my invention to provide a process for the concentration of fluid products that overcomes these disadvantages and difficulties of prior art processes of the freeze concentration type.

It is another object of my invention to provide a freeze concentration process that can be practiced on a commercial scale to process a wide variety of liquid products.

It is still another object of my invention to provide a process that can be practiced on relatively inexpensive equipment as compared with the prior art processes.

Other objects and advantages of my invention will be apparent from a consideration of the description herein with reference to the drawing which is a diagrammatical illustration of the steps of my novel process as it is applied to the concentration of a citrus juice, such as orange juice.

After being extracted from the fruit and processed through a finisher 8 to remove the seeds and rag, the whole juice is passed through line 9 into a separator 10 of suitable design and type. The separator 10 separates the whole juice into a pulp fraction and a liquid fraction, reducing the pulp fraction remaining in the liquid to less than 6% insoluble solids. The liquid fraction, which has a concentration of 9° to 15° Brix, is discharged through line 12 into a heat exchanger 14 and the pulp fraction is drawn off from the separator 10 for heat treatment or other processing that does not form a part of this invention.

The heat exchanger 14 serves to pre-cool the liquid fraction before it is passed through line 16 and mixed with a concentrated, cold liquid that is drawn off a separating vessel 18 through line 20. This liquid from vessel 18 is at a temperature of about 24° to 29° F. and has been concentrated to about 18° to 30° Brix. Since it is at a temperature below the freezing point of the water phase of the incoming liquid in line 16, seed crystals of ice will be formed instantaneously in the mixture. The mixture is then pumped by pump 22 into one or more chillers 24 preferably of the swept surface type. The minute seed crystals of ice are rapidly increased in size by the fast cooling in chillers 24 resulting in a larger, more durable ice crystal than can be produced by other known continuous methods. Also, the addition of the higher concentrated liquid from vessel 18 minimizes the formation of ice on the heat transfer surfaces of chillers 24 because of the increased soluble solids content of the mixture.

After discharge from the chillers 24 the ice crystals and liquid are separated by passing the mixture into separating vessel 18 where the ice crystals are allowed to rise naturally to the top level of the liquid. As already mentioned, liquid of a concentration of 18° to 30° Brix is drawn off vessel 18 at a level below line 26, through line 20, and mixed with the incoming liquid in line 16. A strainer 28 preferably is provided at the connection of line 20 with vessel 18 to prevent ice crystals from being carried out at this point. The ice mass formed at the top of vessel 18 is then removed either mechanically or by gravity. With some products, such as citrus juice, the ice crystals withdrawn from the top of vessel 18 carry with them some of the concentrated liquid. This is because capillary action holds the liquid on the surfaces of the ice crystals, and as these ice crystals become joined together in a soft mass, they will entrain the liquid. Therefore, the mixture is passed through a vacuum strainer 30 or into a basket-type centrifuge (not shown) for separation into ice and concentrated liquid, the ice fraction being discharged into a tank 32.

Tank 32 is divided into two compartments 34 and 36 by a screen 38. The ice crystals from vessel 18 are discharged into compartment 34 where those that do not melt will remain. The ice water formed from the melting ice will pass through screen 38 into compartment 36 from where it is withdrawn through a line 40 and circulated through the heat exchanger 14. A pump 42 in line 40 circulates the ice water through the heat exchanger 14 to pre-cool the juice fraction from separator 10 and returns the water to compartment 34 of tank 32 through line 44. Here the water is used to melt the ice in compartment 34, the cold ice water then passing through screen 38 into the compartment 36.

%% END PAGE %%

This arrangement utilizes available refrigeration to lessen the load on the chillers 24. Generally, there is refrigeration in excess of that required to pre-cool the incoming juice in heat exchanger 14 and this excess can be utilized for other purposes in the processing plant. For example, if my novel process is used as a part of larger and a more elaborate concentrating system, such as that disclosed in my co-pending patent application Serial No. 108,632, filed May 8, 1961, this excess refrigeration could be used to cool the pulp fraction in such a system.

The ice separated from the liquid juice fraction is also utilized for a second important purpose. The ice water in compartment 36, in addition to being used to pre-cool the incoming juice, is withdrawn through line 46 by pump 48 and used for water extraction of the pulp originally separated from the juice by finisher 8. This pulp is withdrawn from finisher 8 through line 50 and passed into suitable extraction apparatus 52, the ice water being pumped into apparatus 52 through line 46. This is a highly desirable arrangement for at least two reasons. First, since the ice water from compartment 36 contains some juice, even though a very small amount, loss of soluble solids is thereby reduced to almost zero in my system. Also, some of the disadvantages of water extraction of the pulp with tap water are avoided since this arrangement makes my novel system a completely closed system, nothing being introduced into the system except the product to be processed.

The liquid extracted from the pulp is withdrawn from the apparatus 52 and insoluble solids are removed by the centrifuge 54. The liquid fraction discharged from centrifuge 54 is at a concentration of about 3° to 7° Brix and therefore is passed into a suitable evaporator 56 where it is concentrated. The heat utilized in the evaporation process unfortunately destroys much of the flavor and, therefore, the concentrate is passed into a blend tank 58 where it is mixed with the liquid juice fraction that has been concentrated by the freeze method and pumped through line 60 from the vacuum strainer 30 by pump 62. These two fractions are blended in suitable amounts to obtain the desired concentration, which for commercial frozen orange juice concentrate is above 42° Brix.

My novel process so far has been described as being suitable for handling and concentrating all the juice to be processed. However, my process could be used as a part of a larger and more elaborate system in which only juice extracted from selected fruit of the highest quality is processed in the above described manner and thereafter mixed with juice from fruit of lesser quality that has been processed separately and concentrated by evaporation. The juice from the selected fruit that is concentrated according to my novel process is of extremely fine flavor and appearance and will produce a good quality final product even though blended with the relatively flavorless concentrate from the oranges of lesser quality. The advantage of using my novel process as a part of such a system is that a high quality single strength juice can be concentrated without loss of flavor and therefore the evaporated flavorless juice need not be concentrated to such a high concentration in order to produce a final product concentration above 42° Brix. This lessens the load on the evaporators since the juice of lesser quality need be concentrated to only about 50° Brix whereas otherwise the evaporators must be operated to produce a much higher concentrate. This would materially increase the capacity of the evaporators while still maintaining the quality of the final product at least equal to that now produced. As an illustration, my novel process could be used in the system disclosed in U.S. Patent No. 2,724,652 by concentrating the cut-back juice, thereby lessening the load on the evaporators which in this patent are shown to be operating at about 60° Brix.

Although my process has been described in connection with citrus juice this is for purposes of illustration only. My novel process can be applied as well to the concentration of other fruit juices, vinegar, coffee, tea, beer, and other liquid products. When used in most of these processes, water extraction of pulp would not be required. However, in the concentration of tea, coffee, etc., the liquid produced from melting the separated ice fraction can be used for the percolator of subsequent batches thereby minimizing losses that normally occur in these processes.

It is, therefore, my intention that the invention not be limited to the illustrated embodiment but that such changes and modifications therein as are obvious to those skilled in the art be included within the scope of the invention as defined by the following claims.

I claim:

1. A method of concentrating a citrus juice comprising: separating said juice into a pulp fraction containing insoluble solids and a first liquid fraction, cooling said liquid fraction to a temperature below the freezing point of the water phase of the liquid fraction to form ice crystals; separating said ice crystals from said liquid fraction to form a concentrated first liquid; melting the ice crystals to form cold water; combining the water so formed with pulp fraction; removing the insoluble solids from said pulp fraction and water mixture to form a second liquid of relatively low concentration; concentrating said second liquid; and mixing said concentrated first liquid with said concentrated second liquid fraction to form a final product of the desired concentration.

2. A method of concentrating a citrus juice comprising separating said juice into a pulp fraction and a liquid fraction; pre-cooling the liquid fraction by passing it through a heat exchanger; cooling the liquid fraction further to a temperature below the freezing point of the water phase of the liquid to form ice crystals; removing the ice crystals from the liquid fraction to produce a first concentrated liquid; melting the ice crystals to form cold water; circulating said cold water through the heat exchanger to precool the liquid fraction flowing therethrough; utilizing the water thus warmed by pre-cooling to melt said ice crystals; combining some of said cold water with said pulp fraction; removing the insoluble solids from said pulp fraction and water mixture to produce a second liquid of relatively low concentration; concentrating said second liquid to a higher concentration; and combining said second liquid with said first concentrated liquid to produce a final product of the desired concentration.

References Cited by the Examiner

UNITED STATES PATENTS

| | | | |
|---|---|---|---|
| 2,632,314 | 3/53 | Vance | 62—380 X |
| 2,657,555 | 11/53 | Wenzelberger | 62—58 |
| 2,765,235 | 10/56 | Wenzelberger. | |
| 2,890,961 | 6/59 | Davis | 99—205 |
| 2,896,419 | 7/59 | Thompson. | |
| 2,916,386 | 12/59 | Toulmin | 62—58 |
| 2,997,856 | 8/61 | Pike | 62—58 |
| 3,012,409 | 12/61 | Ashley | 62—67 X |
| 3,017,751 | 1/62 | Hawkins | 62—123 X |
| 3,050,953 | 8/62 | Wilson | 62—58 |
| 3,156,571 | 11/64 | Walker | 62—58 |

FOREIGN PATENTS

| | | |
|---|---|---|
| 841,374 | 7/60 | Great Britain. |
| 70,507 | 6/46 | Norway. |

NORMAN YUDKOFF, *Primary Examiner.*

RICHARD A. O'LEARY, *Examiner.*